United States Patent Office 3,255,200
Patented June 7, 1966

3,255,200
MANUFACTURE OF IMIDAZOLE
Harold A. Green, Havertown, Pa., assignor to Air Products and Chemical, Inc., Philadelphia, Pa., a corporation of Delaware
No Drawing. Filed May 29, 1963, Ser. No. 283,957
2 Claims. (Cl. 260—309)

This invention relates to the manufacture of imidazole, and particularly to a vapor phase synthesis over a dehydrogenation catalyst.

In accordance with the present invention, imidazole is made by passing a gaseous mixture through a bed of catalyst particles consisting essentially of more than 98% inert sorptive refractory oxide and from 0.1 to 2% noble metal of the group consisting of palladium and platinum, said catalyst particles being maintained at a temperature within the range from about 340° C. to about 480° C., said gaseous mixture consisting essentially of hydrogen and organic reactant selected from the group consisting of a diformylethylenediamine and a mixture of one mol of ethylenediamine and at least two but less than three mols of a member of the class consisting of formic acid and formamide, the hydrogen being present to provide a ratio of hydrogen volume to volume of ethylene diamine component within the range from about 3:1 to about 30:1, and separating imidazole from the effluent from the catalyst.

The nature of the invention is further clarified by reference to a plurality of examples.

Example I

A three-necked 2 liter flask was equipped with reflux condenser and a funnel for adding a liquid reactant at a controlled rate. After 500 ml. (12.6 mols) of formamide were heated at about 100° C., dropwise addition of ethylenediamine was commenced, and was continued until 360 g. (6 mols) had been added during one hour. The reaction mixture was heated and stirred at 150° C. for an hour, after which no additional ammonia was evolved. The diformylethylenediamine (M.P. 110° C.) was prepared by amine exchange with formamide in accordance with the equation:

$H_2NH_2CH_2CH_2NH_2 + 2HCONH_2 \rightarrow$
$HCONHCH_2CH_2NHOCH + 2NH_3$

Formamide is the preferred reactant in preparing the diformylethylenediamine, but in alternative procedures, such a product may be prepared from formic acid, formyl-chloride, methyl formate, etc., by reaction with EDA.

A bed of catalyst granules was positioned between two beds of inert granules in the central portion of a tube furnace. The catalyst granules consisted of sorptive alumina impregnated with about 0.5% by weight metallic platinum. In the preparation of the granules, alpha alumina trihydrate was dehydrated to form particles of sorptive alumina, which were impregnated with chloroplatinic acid, and the chloroplatinated granules were dehalided by treatment with a gas mixture consisting of 9 volumes of steam and one volume of hydrogen at 950° F. for forty hours, whereby 0.5% platinum on alumina granules were prepared.

Vapors of diformylethylenediamine were mixed with hydrogen to provide about 5 volumes of hydrogen per volume of diamide. The flow rate provided approximately 0.7 volume of liquid ethylene diamine derivative per volume of catalyst per hour.

Engineers discussing space rates, hydrogen ratios, stoichiometric yields and related values, for the synthesis of an organic compound from a variety of reactant streams sharing in common a principal nucleus component prefer to base all calculations on such principal nucleus. Hence, the imidazole data are related to the quantities of ethylenediamine component whether directed to the reactor as the diamide or as the diamine.

The effluent from the catalyst chamber was cooled to separate a liquid crude product, a sample of which was analyzed chromatographically to determine the conversion to imidazole. The yield was shown to be dependent in part upon temperature. At 400° C. the imidazole yield was 35% but at 455°, it was 46% or approximately 33% better. Further proof of the interrelationship of temperature and space rate was obtained in a series of runs at a space rate of 0.5 (instead of 0.7) volume of diformylethylenediamine per volume of catalyst per hour. During the fifth hour at 455° C., the yield of imidazole was 51%, the percentage yield being calculated so that the theoretically maximum possible yield would be 100%.

In another run in which the space rate was lowered to 0.2 volume of diformylethylenediamine per volume of catalyst per hour, and the hydrogen to ethylenediamine component ratio was increased to 9 to 1, the imidazole yield was 55% of that theoretically attainable. The attainment of 55% of the stoichiometric yield was deemed evidence of the suitability of the method for industrial production of imidazole.

In distilling the crude reaction product, it was convenient to remove byproducts boiling below about 200° C. by straight distillation. Then a volume of a technical grade of methylnaphthalene (B.P. 240–244° C.) about ten times the volume of the crude product, was added (preferably intermittently) for codistillation. Imidazole was codistilled with the hydrocarbon. When the codistillate cooled, a technical grade of imidazole was precipitated, and was separated by filtration. This was further purified by recrystallization from heptane.

Example II

Formic acid was employed as a solvent for diformylethylenediamine and the solution was volatilized in a hydrogen stream providing about 3 mols of hydrogen per mol of the component providing the ethylenediamine nucleus. The gas stream consisting of formic acid, hydrogen, and diformylethylenediamine was directed through a bed of platinum on alumina catalyst particles at 420° C., at 0.5 liquid hourly space rate to obtain a yield of imidazole which was 42% of the stoichiometric quantity.

Example III

A gas stream containing by volume approximately 90% hydrogen, 6.67% formamide, and 3.33% ethylenediamine was passed through a bed of platinum on sorptive alumina to prepare imidazole at 410° C. and a space rate (based on liquid volume of ethylenediamine per volume of catalyst per hour) of 0.3 to produce imidazole in a quantity approximately 70% of the stoichiometric amount.

In a control experiment at the same reaction conditions excepting for the use of a cobalt molybdate on alumina as the catalyst instead of platinum on alumina, no significant amount of imidazole was produced. Thus, the criticality of the noble metal such as platinum as the dehydrogenation component of the catalyst was established.

In another control experiment, an isothermal reactor containing 150 ml. of quartz beads as a preheater and 175 ml. of sorptive alumina particles containing platinum and substantially free from halide and prepared in accordance with Example I was utilized. The ratio of hydrogen to ethylenediamine was substantially 5 to 1, and the space rate was about 0.25 volume of ethylenediamine per volume of catalyst per hour. At 430° C., the yield of imidazole as determined by chromatographic analysis of the effluent from the catalyst chamber was only 10.5% when the reactant stream was a mixture of ethylenediamine and methyl formate, thus establishing the lack of suitability of methyl formate in the imidazole synthesis. The reason why good results can be obtained with formic acid and formamide but not with methyl formate is not known.

*Example IV*

Large amounts of hydrogen are beneficial in vapor phase synthesis of imidazole. A gas mixture of two mols of formamide, one mol of ethylenediamine and 30 mols of hydrogen was passed through a catalyst bed at a liquid space rate of about 0.35 volume of ethylenediamine per volume of catalyst per hour at a temperature of 400° C. to provide imidazole (determined by chromatographic analysis of crude product) representing 54 mol percent of the ethylenediamine charged to the reactor. The catalyst granules contained 0.5% platinum, prepared by hydrogenative steaming of chloroplatinated sorptive alumina, and were characterized by substantial freedom from acid activity.

By a series of tests it is established that imidazole can be satisfactorily prepared in this type of operation only when a gaseous mixture characterized by a ratio of hydrogen volume to volume of the ethylenediamine component within the range from about 3:1 to about 30:1, is passed through a bed of catalyst particles consisting essentially of more than 98% inert sorptive refractory oxide and from 0.1 to 2% noble metal of the group consisting of palladium and platinum, said catalyst particles being maintained at a temperature within the range from about 340° C. to about 480° C., said gaseous mixture consisting essentially of hydrogen and organic reactant selected from the group consisting of a diformylethylenediamine and a mixture of one mol of ethylenediamine and at least two but less than three mols of a member of the class consisting of formic acid and formamide, and separating imidazole from the effluent from the catalyst.

Various modifications of the invention are possible without departing from scope of the appended claims.

What is claimed is:

1. The method of preparing imidazole which includes the steps of directing a gas stream containing a predominant volume of hydrogen, formamide, ethylenediamine and reaction products thereof over a dehydrogenation catalyst consisting of sorptive alumina supporting from 0.1 to 2% by weight metallic platinum at a temperature within the range from about 340 to about 480° C., thereby forming imidazole; and separating imidazole from the effluent from such dehydrogenation catalyst.

2. The method of preparing imidazole which consists essentially of the steps of directing a gaseous mixture through a bed of dehydrogenation catalyst particles consisting essentially of more than 98% inert sorptive refractory oxide and from 0.1 to 2% noble metal of the group consisting of palladium and platinum, said catalyst particles being maintained at temperature within the range from about 340 to about 480° C., said gaseous mixture consisting essentially of hydrogen and a mixture of one mol of ethylenediamine and at least two but less than three moles of formamide, there being at least 3 but not more than about 30 mols of hydrogen per mol of ethylenediamine component; and separating imidazole from the effluent from such catalyst.

References Cited by the Examiner

UNITED STATES PATENTS

| | | | |
|---|---|---|---|
| 2,155,877 | 4/1939 | Waldmann et al. | 260—309.6 |
| 2,226,057 | 12/1940 | Graenacher et al. | 260—309.6 |
| 2,399,601 | 4/1946 | Kyrides et al. | 260—309 |
| 2,648,709 | 8/1953 | Sletzinger | 260—561 |
| 2,847,417 | 8/1958 | Erner | 260—309 |

OTHER REFERENCES

Carlson Extractive and Azeotropic Distillation, in Weissberger Technique and Organic Chemistry, vol. 4 (Distillation), pp. 359–64; New York, Interscience, 1951.

WALTER A. MONDANCE, *Primary Examiner.*

JOHN D. RANDOLPH, *Examiner.*

NATALIE TROUSOF, *Assistant Examiner.*